July 21, 1959     H. W. BEVARLY ET AL     2,895,271
METHOD OF AND APPARATUS FOR PRODUCING PACKAGES
OF PLASTIC MATERIAL AT HIGH CYCLIC RATES
Filed May 18, 1956     13 Sheets-Sheet 1

INVENTORS
HENRY W. BEVARLY
WALTER F. WHITSON
CARL C. YANN

BY    W. E. Sherwood
ATTORNEY

July 21, 1959 H. W. BEVARLY ET AL 2,895,271
METHOD OF AND APPARATUS FOR PRODUCING PACKAGES
OF PLASTIC MATERIAL AT HIGH CYCLIC RATES
Filed May 18, 1956 13 Sheets-Sheet 2

INVENTORS
HENRY W. BEVARLY
WALTER F. WHITSON
CARL C. YANN

BY W. E. Sherwood
ATTORNEY

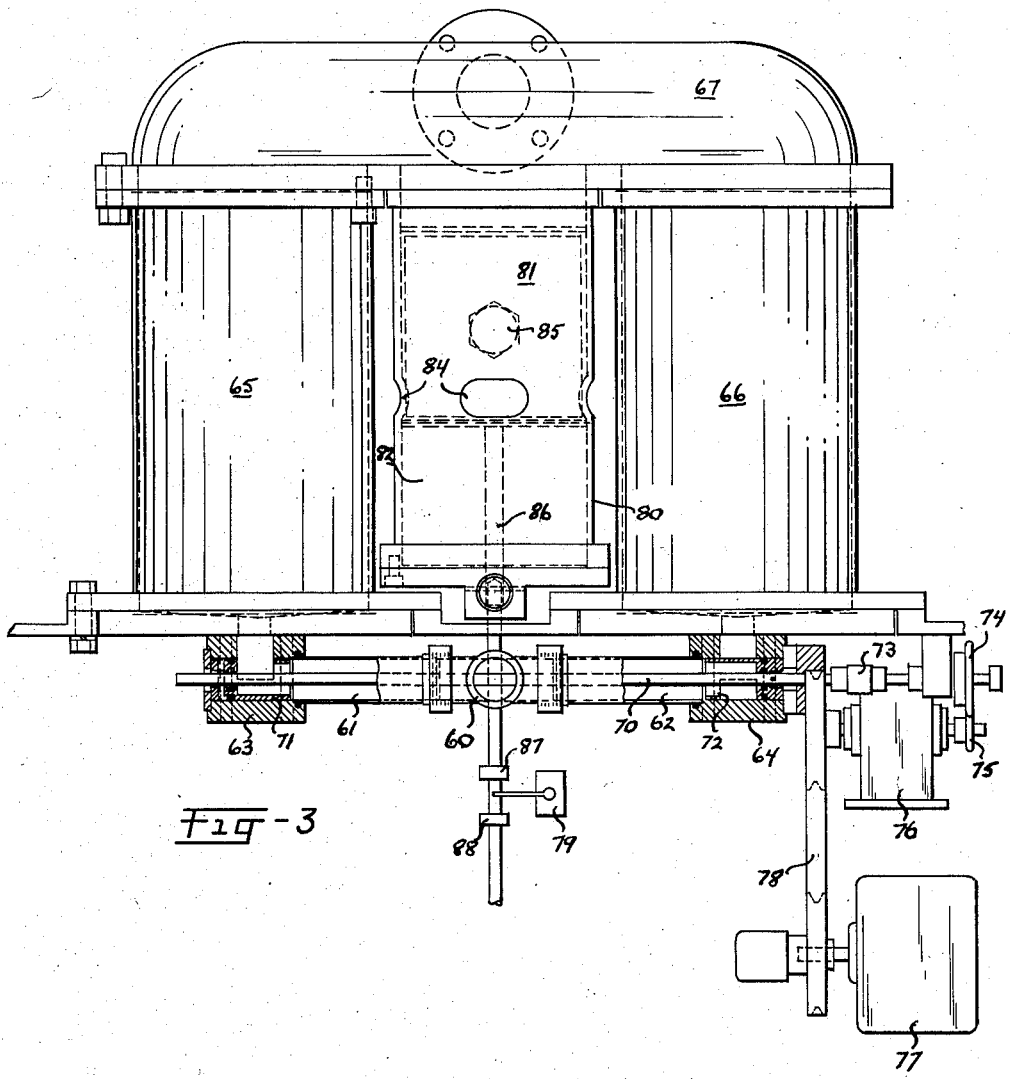

July 21, 1959  H. W. BEVARLY ET AL  2,895,271
METHOD OF AND APPARATUS FOR PRODUCING PACKAGES
OF PLASTIC MATERIAL AT HIGH CYCLIC RATES
Filed May 18, 1956  13 Sheets-Sheet 4
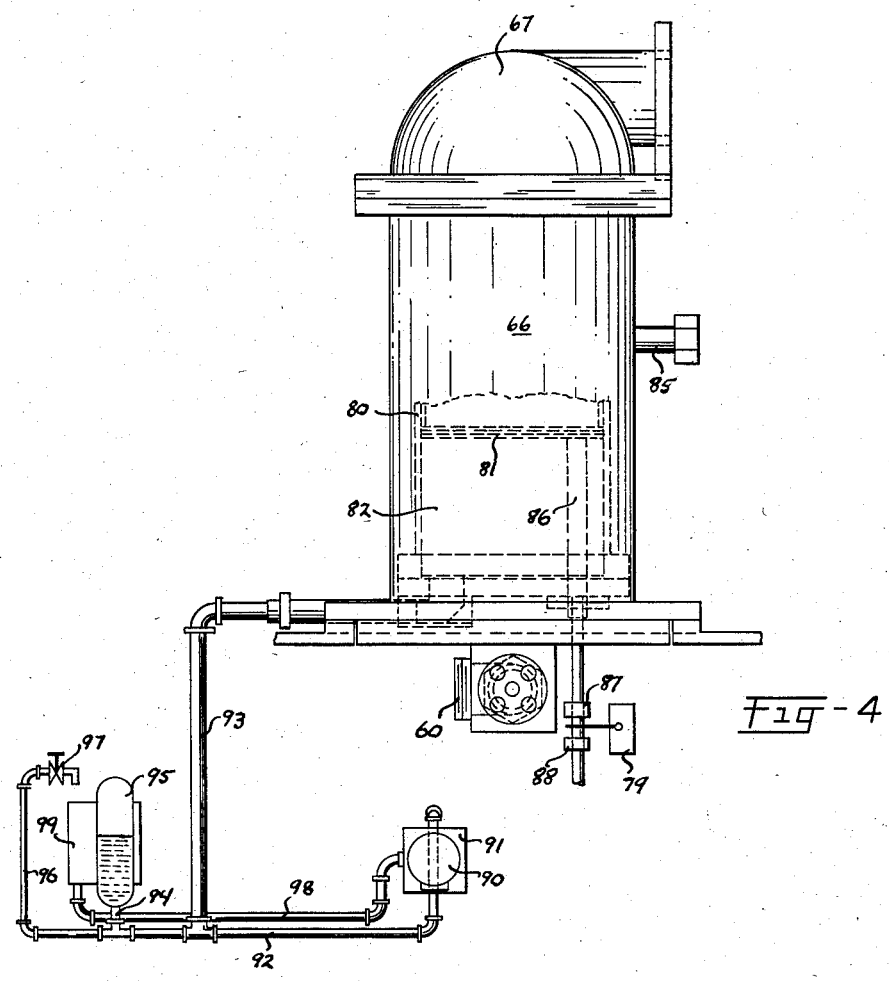
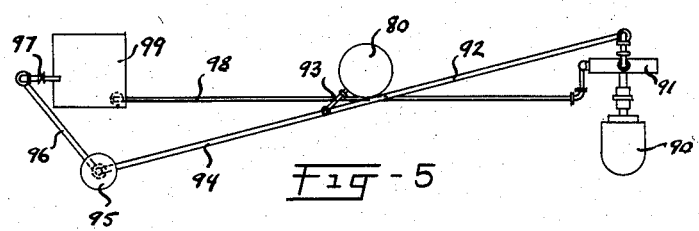
INVENTORS
HENRY W. BEVARLY
WALTER F. WHITSON
CARL C. YANN
BY
W. E. Sherwood
ATTORNEY

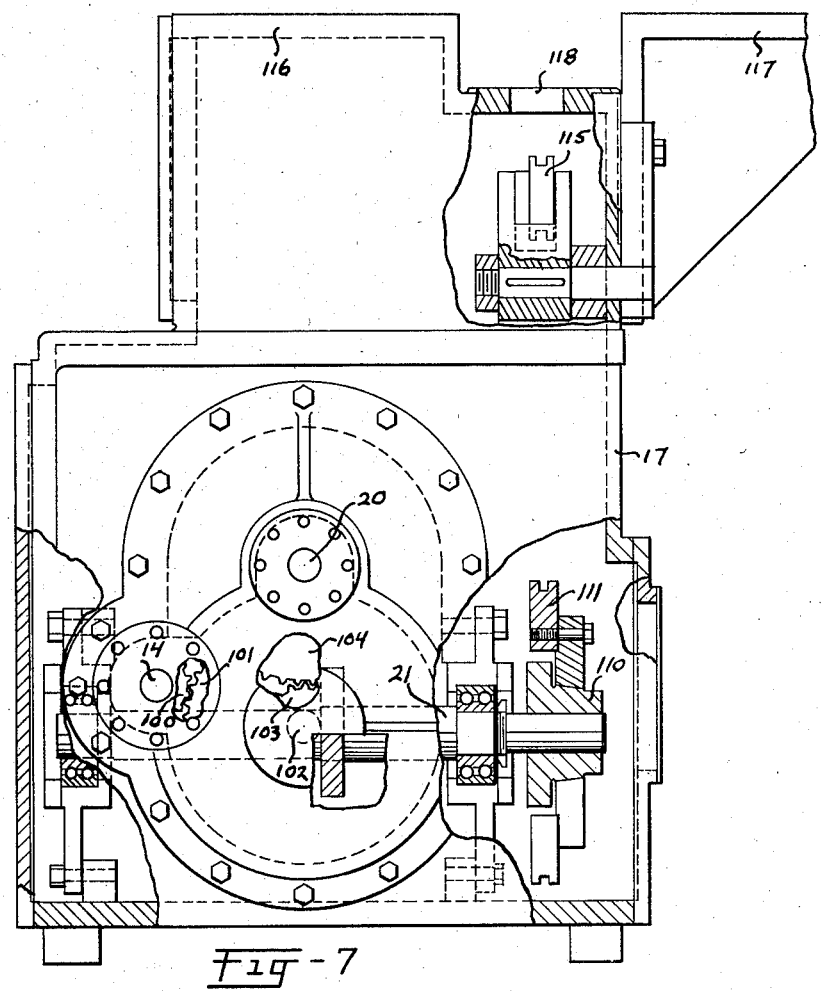

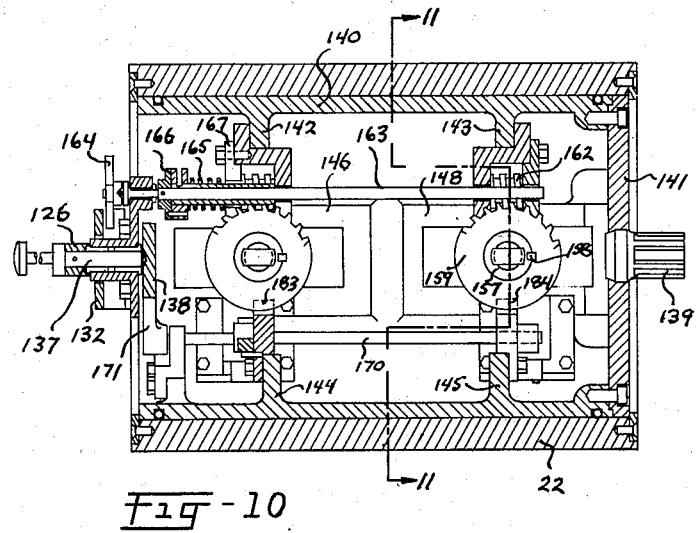

INVENTORS
HENRY W. BEVARLY
WALTER F. WHITSON
CARL C. YANN

BY

W.E. Sherwood
ATTORNEY

INVENTORS
HENRY W. BEVARLY
WALTER F. WHITSON
CARL C. YANN

BY W.E. Sherwood
ATTORNEY

July 21, 1959 H. W. BEVARLY ET AL 2,895,271
METHOD OF AND APPARATUS FOR PRODUCING PACKAGES
OF PLASTIC MATERIAL AT HIGH CYCLIC RATES
Filed May 18, 1956 13 Sheets-Sheet 11

INVENTORS
HENRY W. BEVARLY
WALTER F. WHITSON
CARL C. YANN
BY
W. E. Sherwood
ATTORNEY

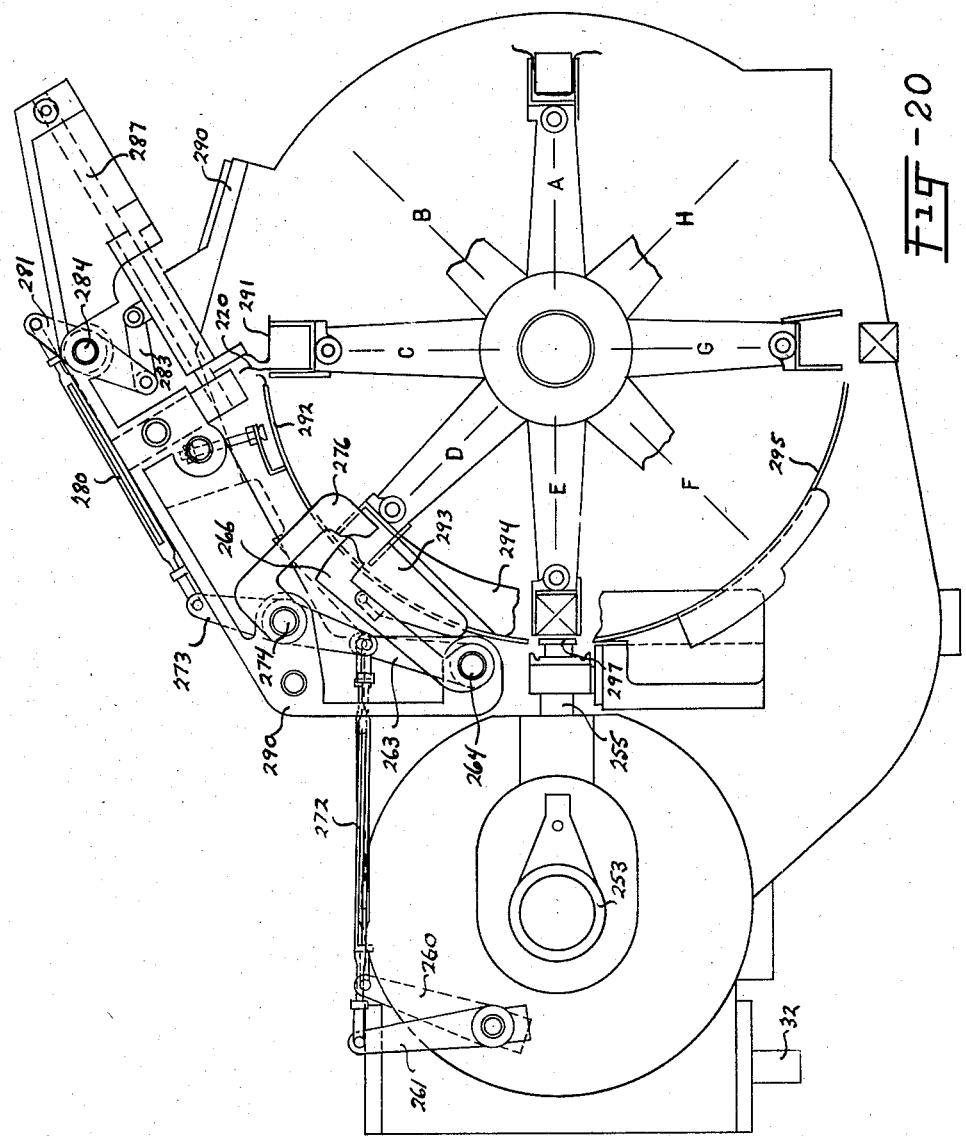

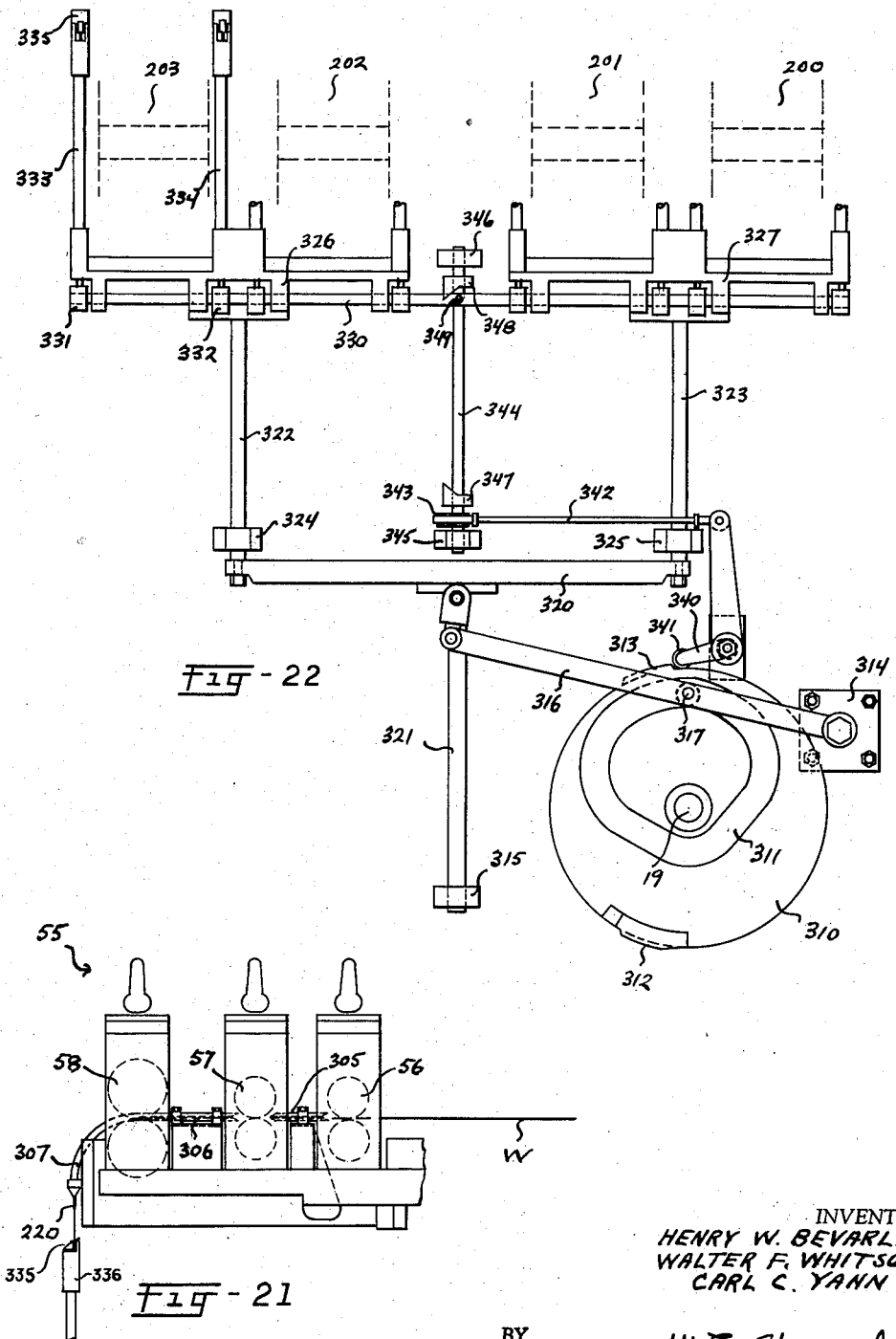

United States Patent Office 2,895,271
Patented July 21, 1959

2,895,271

METHOD OF AND APPARATUS FOR PRODUCING PACKAGES OF PLASTIC MATERIAL AT HIGH CYCLIC RATES

Henry W. Bevarly, Walter F. Whitson, and Carl C. Yann, Louisville, Ky., assignors to Chemetron Corporation, a corporation of Delaware Application May 18, 1956, Serial No. 585,737

22 Claims. (Cl. 53—21)

This invention relates to the production of separate units of plastic materials at a relatively high cyclic rate, and in a more limited aspect to the molding and wrapping of units of such materials. Among the classes of edible material which may be treated in accordance with our invention are margarine, butter, lard, ice cream and many other diverse products. Among the classes of non-edible materials are soaps, waxes, greases and the like.

The term "plastic material" as used herein includes generally those moldable materials which, in their commercial usage, are sold in semi-solid state. Frequently, such materials are in a liquid state at some stage of their preparation and when an emulsion is formed, as in the manufacture of margarine, it is desirable that the various subsequent stages of handling be such that no separation of the liquids takes place. Such an undesired condition may occur unless precautions are taken to prevent overworking of the plastic material. Excessive frictional contact of the material within conduits or other structures, excessive pumping of the deformable material, or excessive heating of the material illustrate conditions in which such overworking may occur.

As is well known, in recent years the capacity of continuous processing apparatus for producing plastic materials of this general character has been greatly enlarged in relation to the capacity of conventional apparatus for receiving the material from the continuous production phase of manufacture. Accordingly, full utilization of the capabilities of a given producing apparatus may not be possible, or, alternately, several duplications of the receiving apparatus, such as molders and wrappers, may be required to give sufficient take-off capacity from the improved producing apparatus operating at its best capability. In the latter alternative, floor space considerations, cost of duplicate machines and maintenance factors often prove burdensome.

Moreover, when the plastic material is compelled to travel through long conduits in order to reach a diffusely located molder or wrapper apparatus, or is required to be agitated by pumps between the source and the outlet of its travel, the overworking problem often becomes significant.

As is further known, the uninterrupted operation of continuous producing apparatus is highly desirable and stoppages for the addition of new rolls of wrapping material or for adjustment of sizes of units of material, or for other reason, should be held to a minimum if high output of the installation is to be secured.

It is one object of our invention to provide an improved method and apparatus for producing packaged units of plastic material at a rate consonant with the continuous flow from a material processing source operating at its optimum capacity.

A second object is to provide an improved process and an apparatus in compact form for producing wrapped packages of plastic material at high cyclic rates and without adversely affecting the structure of the plastic material.

A third object is to provide an improved process and an apparatus in compact form for moving plastic material between a continuously flowing inlet for material at superatmospheric pressure and an intermittently operable outlet at atmospheric pressure, while moving the material along a single pressure gradient between the inlet and outlet.

A fourth object is to provide an improved method and apparatus in compact form for receiving a continuous flow of plastic material under pressure and while maintaining the desired pressure therein, directing the material into separate outlets for molding into units.

A fifth object is to provide an improved method and apparatus in compact form for molding and dispensing units of plastic material.

A sixth object is to provide an improved apparatus for supplying and positioning an enwrapment for units of plastic material.

A seventh object is to provide an improved apparatus in compact form for wrapping units of plastic material and for reshaping the wrapped units.

Another object is to provide an improved coordinated drive means for actuating a series of compactly positioned processing machines for handling plastic material.

Still another object is to provide an improved molding apparatus wherein the size of the molding compartments may be adjusted during continued operation of the molding apparatus at high speeds.

Still another object is to provide an improved apparatus for handling and wrapping units of plastic material which apparatus may readily be cleaned, adjusted and maintained.

Still a further object is to provide an improved arrangement of enwrapment supply rolls permitting use of easily positioned large rolls having a capacity insuring uninterrupted operation for relatively long periods of time.

Other objects and advantages will become more apparent when the following description is considered in conjunction with the accompanying drawings in which:

Fig. 3 is an end view drawn to a larger scale of the pressure vessel for receiving material in a constant stream and for flowing the material under pressure into an outlet manifold from which the material is intermittently discharged into separate outlets.

Fig. 4 is a side view of the pressure vessel shown in Fig. 3 and indicating a suitable arrangement of pressure regulation for a volume compensating portion of the vessel.

Fig. 5 is a diagrammatic plan view of the arrangement for pressure regulation.

Fig. 7 is an end view partly in section, showing the mechanism of Fig. 6.

Fig. 8 is an end view of one molding unit.

Fig. 9 is a detail view showing the mounting of the manually operable means for varying the size of molded units.

Fig. 10 is a longitudinal sectional view of portions of a molding unit.

Fig. 20 is a side elevation view, to a larger scale, of a portion of the wrapping mechanism shown in Fig. 17 and showing the mechanism in contact with molded units at certain stations.

Fig. 21 is a detail view of the enwrapment advancing means, and

Fig. 22 is a front elevation view of the enwrapment positioning means with the mechanism shown in its uppermost position at the time of grasping a new enwrapment.

In accordance with our invention, plastic material is supplied in a continuous stream under superatmospheric pressure from high capacity processing apparatus through a short conduit and is directed into a pressure vessel. While in this vessel the material is acted upon by a separately generated back pressure serving to maintain the volume of that vessel and the connections extending therefrom completely filled with plastic material. The material leaves the vessel intermittently and enters a molding apparatus from which it is intermittently discharged at atmospheric pressure. Preferably, the material flows from the inlet leading into the pressure vessel to the discharge outlet from the molding apparatus, along a single pressure gradient, although in its broader aspects the invention contemplates the use of auxiliary pumping means for the material should this be desired. In general, the use of the single pressure gradient helps to avoid the danger of overworking the material. An enwrapment supply and positioning apparatus is provided for interposing an enwrapment at the point of discharge of the molded unit from the molding apparatus. Units of material partially covered by this enwrapment pass into a wrapping apparatus in which they are completely wrapped and reshaped and from which they are dropped upon a take-off conveyor. Preferably, all units of apparatus are closely spaced and the lengths of interconnecting conduits are held to a minimum in order to reduce frictional contact of the material therewith. A single power source preferably drives the several coordinated movable means in high speed timed sequence. In addition, the compact arrangement of the molding and wrapping apparatus makes provision for separation of the two pieces of apparatus for adjustment, cleaning and maintenance, either while at rest or while in operation.

Figure 1:
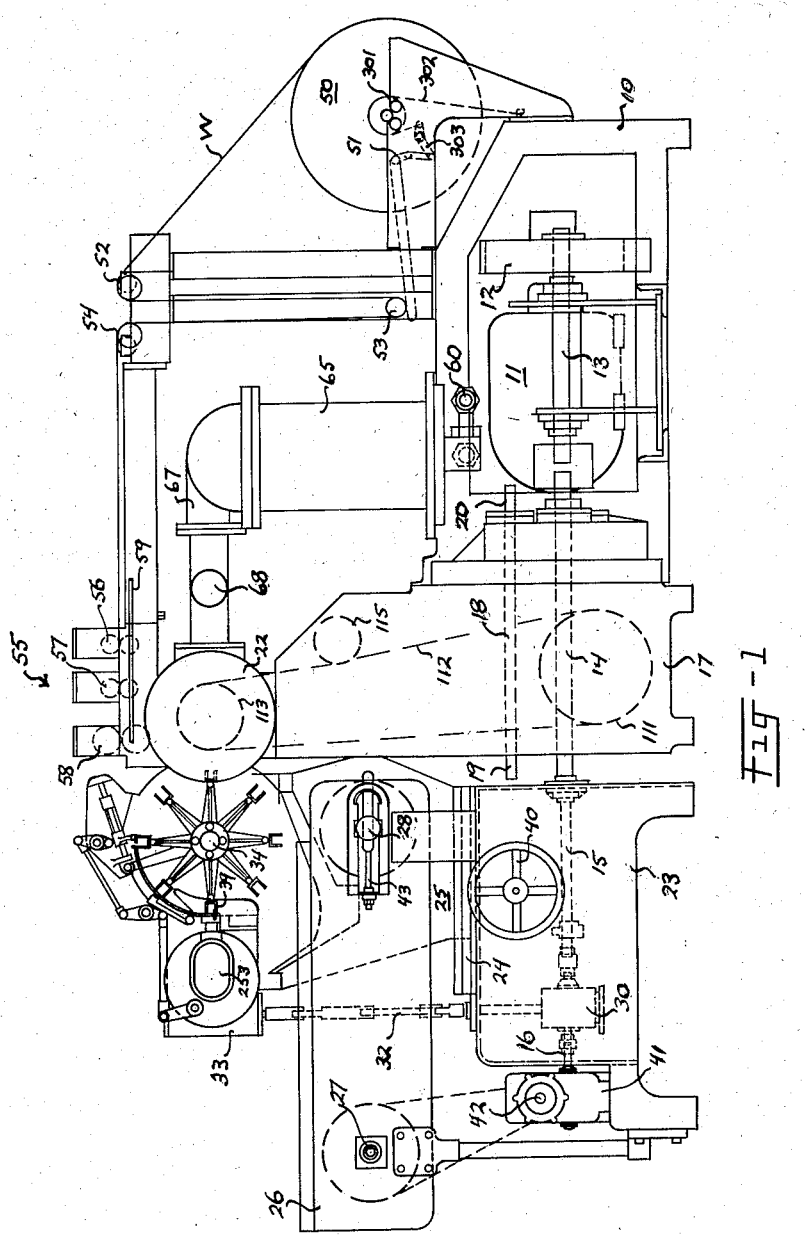
Fig. 1 is a side elevation view showing a preferred arrangement of one form of apparatus suitable for carrying out the invention.

Referring first to the intake portion of the apparatus of Fig. 1, a framework 10 provides a mounting for a main drive motor 11 which, through a conventional selectively adjustable pulley drive 12, serves to drive a longitudinally mounted shafting, including shafts 13, 14, 15 and 16. Shaft 14 is mounted within gear box 17, best shown in Fig. 6, and by means of suitable gearing drives a relatively low speed shaft 18 which at one end 19 provides a drive for an enwrapment positioning mechanism and at a second end 20 provides a drive for the enwrapment advancing mechanism. In addition, shaft 14 drives a transverse shaft 21, best shown in Fig. 7, through a conventional Ferguson roller gear drive, which by means of a chain drive imparts intermittent rotational movement to a plurality of molding units mounted in a housing 22 above the gear box 17.

The output portion of the apparatus shown in Fig. 1 may comprise a framework 23 having a centrally disposed stationary guideway 24 along which a wrapper-machine supporting platen 25 may be reciprocated for a limited distance. By means of suitable brackets and rods the framework may also support a stationary guideway 26 for a suitable conveyor means having a drive shaft 27 and an idler shaft 28 mounted transversely of the guideway.

Figure 2:
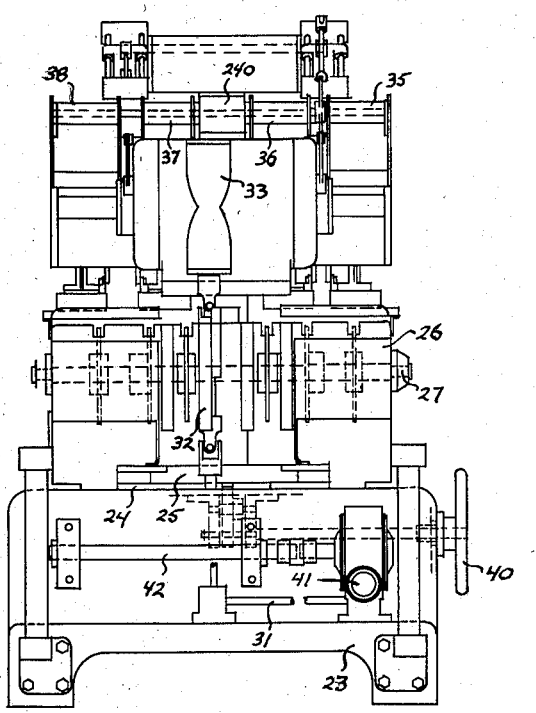
Fig. 2 is an end view of the apparatus of Fig. 1, four wrapping wheels being shown.

Shaft 15 which is suitably coupled to shaft 14 and driven thereby, passes into a conventional gear box 30 from which a transverse shaft 31 extends into a second gear box and from which latter gear box a vertical shaft 32 passes into an upper gear box 33. Shaft 32 preferably is extensible and is provided with suitable universal joints so that it may accommodate movement of the platen 25 while still rotating. Power supplied from shaft 32 serves to actuate a central drive shaft 34 for turning a plurality of wrapping wheels corresponding in number to the molding units provided in casing 22, and here shown as four in number, namely wheels 35, 36, 37 and 38 (Fig. 2). In addition, power from shaft 32 serves to actuate a molded unit reshaping mechanism 39 as well as the several enwrapment folding devices later to be described. It will be understood that the gear box 33, shaft 34, wrapping wheels and folding devices are all supported upon platen 25 so that they may be moved as a unit toward or away from the casing 22 for purposes which will later become apparent, such as for initial starting, for cleaning, or for maintenance. Such movement may conveniently be obtained by adjustment of a handwheel 40 which, by means of a conventional rack and pinion, may effect such movement even while shaft 32 is rotating, should this be desired.

Shaft 16 extending from gear box 30 into gear box 41 serves to drive a shaft 42 which, through a suitable chain or equivalent means, provides the actuation of the drive shaft 27 of the conveyor. Moreover, shaft 42 may, if desired, provide the drive for a conventional cartoning machine, not shown, into which wrapped, molded packages of material are fed from the output end of the conveyor. A suitable take-up means indicated at 43 may be employed to adjust the distance between the conveyor shafts 27 and 28.

For the purpose of interposing an enwrapment between units being discharged from the molding casing 22 and the wrapping wheels into which such units are received, an enwrapment supply system such as shown in Fig. 1, is provided. A separate supply roll 50 for each combination of a molding and wrapping unit is suitably mounted upon a shaft transverse to the direction of enwrapment travel and is provided with a braking mechanism, later to be described. The enwrapment passes over a first idler roll 52, thence under an improved dancing roll 53 and over a second idler roll 54, whence it is drawn into the enwrapment advancing apparatus indicated generally at 55. This apparatus may comprise a plurality of pairs of rolls 56, 57 and 58 driven by a shaft 59 which is suitably driven from the end 20 of shaft 18. Preferably, the apparatus is mounted closely adjacent the top of molding casing 22 and an enwrapment is guided downwardly between that casing and the cooperating wrapping wheels and properly positioned in stretched condition by the enwrapment position means best shown in Figs. 21 and 22. That positioning means is actuated by end 19 of the same shaft 18 which actuates the enwrapment advancing apparatus 55. In general, the advancing apparatus is of conventional form and comprises a pair of rolls 56 which pulls the enwrapment from the roll 50; a pair of severing rolls 57 which cuts the trailing edge of an enwrapment at the time the enwrapment is engaged by the advancing rolls 58; and a pair of advancing rolls 58 which feed the severed enwrapment into engagement with the positioning means.

With the foregoing general description of the apparatus for handling moldable material in mind, reference now is made to the continuously flowing stream of moldable material under pressure which enters the apparatus through a conduit 60.

*The pressure vessel and back pressure system*

As best shown in Fig. 3, conduit 60 is connected to a sanitary T leading into two aligned conduits 61 and 62, which conduits are mounted at their extreme ends in spaced valve housings 63 and 64. These housings communicate respectively with the lower ends of two spaced storage compartments 65 and 66 of the pressure vessel. At the upper ends these compartments communicate with a large header 67 which in turn leads to the manifold 68 best shown in Fig. 1, and from which separate connections, corresponding in number to the separate molding units, lead directly to those units.

Extending through the aligned conduits and valve housings is a valve shaft 70 having conventional rotary sleeve valves 71 and 72 mounted thereon and controlling flow from conduit 60 into the storage compartments. It is to be noted that in the preferred operation flow takes place into those compartments alternately and that at any given time at least one of said compartments is in communication with the supply conduit 60. At one end the valve shaft 70 is provided with an extension 73, terminating in a sprocket 74. That sprocket is adapted to be driven by a chain passing over a second sprocket 75 which is mounted on a shaft extending from gear reducer 76. A small motor 77 provides power to gear reducer 76 by means of a conventional adjustable cone pulley drive 78.

As will be understood, the plastic material entering through conduit 60 completely fills the pressure vessel; its connected header; the manifold; and the subdividing connections to the molding units; and is maintained under superatmospheric pressure at all times. For the purpose of accommodating the fluctuations of volume in the pressure vessel, due to the continuous input and an intermittent output, there is provided an improved expansible accumulator chamber 80 communicating at one end with header 67 and having a floating piston 81 in the chamber with a pressure medium space 82 beneath the piston. In order to secure optimum movement of plastic material without overworking of the same, and simultaneously to provide a compact assembly, we prefer to arrange the axis of chamber 80, parallel to the axes of the storage compartments and to locate the expansible chamber intermediate these compartments.

At a central location the chamber wall is provided with a series of venting apertures 84 through which any material leaking between the piston and the chamber wall may escape to the outside of the pressure vessel and be readily cleaned therefrom. As a consequence, no material can leak into the expansible space 82 beneath the piston and mix with the pressure medium supplied thereto. At a location nearer the header 67 an outlet vent 85 in the chamber wall serves to relieve excess volumes of plastic material when that vent is uncovered by piston 81. Material passing through vent 85 may be directed to reprocessing tanks for salvage.

Extending outwardly from piston 81 is a control rod 86 suitably sealed in the bottom wall of chamber 80 and carrying a pair of adjustably mounted switch actuating contactors 87 and 88.

As a significant part of the structure, means are provided to maintain a back pressure at all times upon the piston 81 to the end that a reliable control may be maintained continuously upon the overall system and to insure that all space within the pressure vessel and its connected parts is filled with plastic material. This back pressure system may comprise merely a simple source of compressed air maintained at a fixed pressure and connected to chamber 80 beneath piston 81. However, it is preferred to employ a more reliable liquid pressure, even at the cost of a more elaborate construction, due to the significant control exerted upon the overall process at this particular stage. One form of apparatus, as shown in Fig. 4, may include a separate motor 90 driving a pump 91 which discharges a liquid into pressure line 92. Through a connection 93 this liquid is supplied to space 82 beneath the piston in the expansible chamber 80 and simultaneously is supplied through connection 94 to the bottom of an air accumulator 95, and through still another connection 96 to an adjustable throttling valve 97. A suction line 98 leads to the pump from an open reservoir 99 into which the throttling valve discharges. By means of this arrangement, the air pressure existing in accumulator 95 is effective at all times to cause the liquid to force the piston 81 upwardly in cylinder 80. Moreover, the value of that air pressure may be adjustably selected by an appropriate setting of valve 97. At start-up, when the volume of plastic material under pressure in the pressure vessel begins to exceed the volume represented by the compartments 65, 66, header 67, connected manifold 68 and connections to the molding casing 22, the piston 81 begins to be depressed in chamber 80, which chamber then accommodates the excess volume of material. As the volume increases, the piston in moving downwardly actuates switch 79 by means of contactor 87 and by means of a suitable connection, not shown, closes the circuit to motor 11. Closing of this circuit initiates the operation of the molding apparatus, later to be described, and permits withdrawal of material from the connections leading from the pressure vessel. The motor 11 continues to run until switch 79 is actuated in reverse direction by contactor 88. Actuation in that reverse direction opens the motor circuit and the molding apparatus would thereupon coast to a halt unless sufficient material is promptly supplied to the pressure chamber to permit the piston 81 again to move downwardly. It, therefore, is apparent that the molding apparatus is operable only when a sufficient amount of material under superatmospheric pressure is being supplied thereto. In this way, the possibility of molding units of material of insufficient size or weight is prevented. Preferably, the settings of contactors 87 and 88 are such as to permit minor fluctuations of flow in the inlet conduit 60 without change in the existing condition of the system.

It will be appreciated that the rotation of valve shaft 70; the air pressure in accumulator 95; and the drive system from main motor 11, are all coordinated in relation to the continuous supply of material from conduit 60 and to the dispensing capacity of the improved molding process and apparatus now to be described.

*The coordinated drive means*

Figure 6:
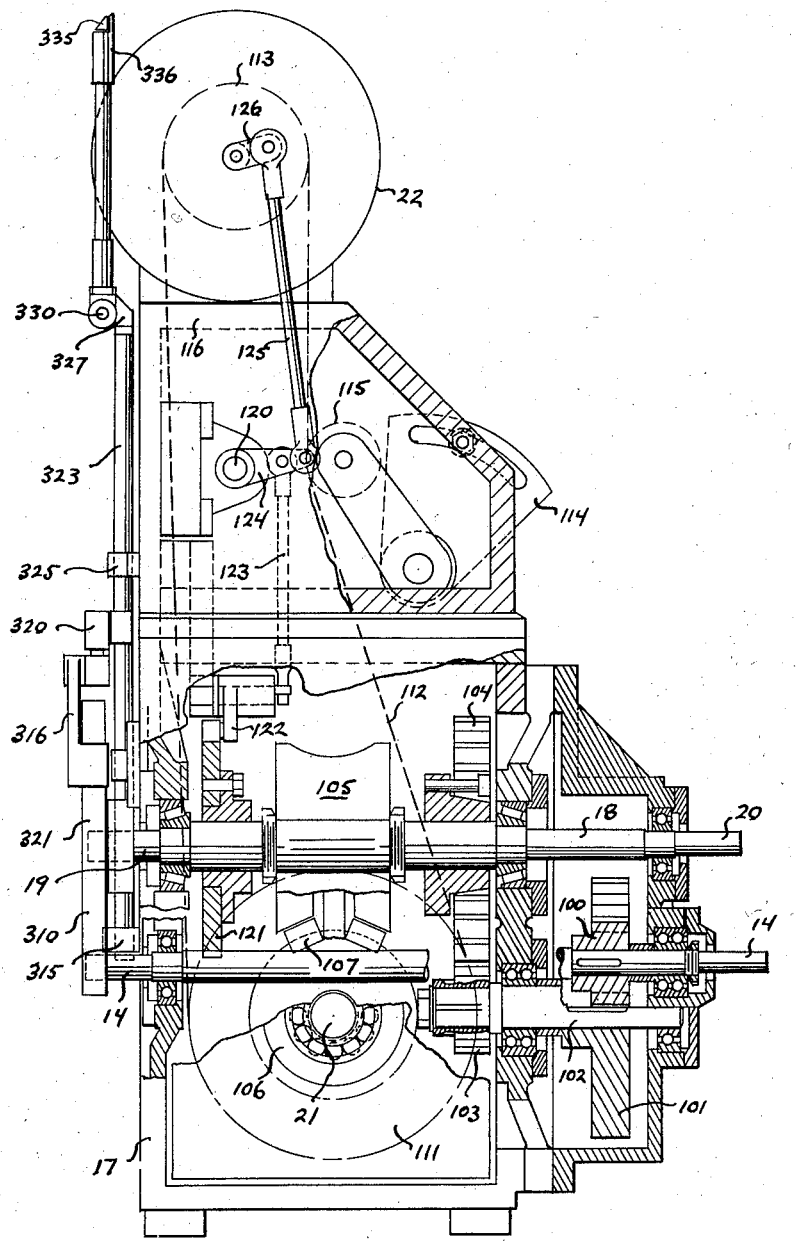
Fig. 6 is side elevation view to a larger scale and partly in section, showing the mechanism for actuating the molder apparatus.

Referring first to Figs. 6 and 7, there is shown a drive means by which the molding apparatus may conveniently be driven to accomplish its coordinated function with the above described apparatus.

Shaft 14 extending through gear box 17 and driven from its connection with shaft 13 carries a spur gear 100 engaging with a larger spur gear 101 on stub shaft 102. This shaft in turn carries a spur gear 103 engaging with a larger spur gear 104 on shaft 18, thus serving to drive shaft 18 at a relatively lower speed. At one end 20 this shaft serves to drive the enwrapment supply means and at a second end 19 it serves to drive the enwrapment positioning means. Accordingly, a coordinated drive for molding and enwrapment purposes is made dependent upon the rotation of shaft 18. Centrally disposed upon shaft 18 is a conventional Ferguson roller gear drive interrupted cam 105 serving as the input of the roller gear drive and of sufficiently heavy construction to withstand the shock of repeated rapid starting and stopping of the molding units to be driven by the mechanism. It will be understood that the configuration of this cam is chosen so as to provide periods of rest or dwell in the apparatus driven therefrom, which, as will later be seen, correspond to the periods during which filling of and extrusion from the mold chambers occurs.

The cam 105 engages with and drives a roller gear 106 which is provided with a series of spaced radially projecting stops 107. These stops are supported upon conventional rotary bearings and the roller gear is mounted upon a shaft 21 which thus is driven intermittently. It will be understood that, at any given time, two or more of the stops are in contact with the interrupted cam 105 and that as the cam rotates, the gear 106 is given an intermittent rotary motion which brings other of the stops into contact with that cam as the first mentioned stops move out of contact therewith.

At its extreme end, shaft 21 carries a hub 110 upon which is mounted a sprocket 111 serving to drive a chain 112 or equivalent means passing over a sprocket 113 mounted centrally of the molding units in casing 22 and driving said units. As shown in dashed lines in Fig. 6, the chain forms an endless loop over the sprockets and is held in taut position by means of an externally adjustable bell-crank 114 carrying an idler sprocket 115.

As best shown in Fig. 7, gear box 17 is provided with dual upper frameworks 116 and 117 adapted to support in a compact arrangement the dual mold casings 22 as will later be described, but with the molding apparatus therein being driven jointly by the chain passing through an elongated aperture 118.

Referring to Fig. 6, the external side of framework 116, as well as the external side of framework 117, not shown, provide a support for a rocking shaft 120 extending through both frameworks. At each end, this shaft is provided with crank arms, to which are attached crank rods extending to other crank arms terminating on the axis of the molding units. These latter crank arms are intermittently movable through an arc of about 15° and serve to actuate tripping mechanism within the mold units, later to be described. For actuation of this structure, shaft 18 carries a suitable cam 121 for actuating a cam follower 122 which in turn moves a tie rod 123 attached to a crank arm on shaft 120 intermediate its ends. Movement of the tie rod therefore rocks shaft 120 which in turn, for example, moves the crank arm 124, the atttached crank rod 125 and the crank arm 126.

*The molding apparatus*

Considering now Fig. 8 wherein there is shown our improved molding mechanism, it will be noted that the stationary casing 22 has a base portion 130 adapted to rest upon the top of framework 116 of the gear box 17 and a side portion 131 adapted to fit against a flange in the structure leading plastic material from manifold 68. On its side confronting the wrapping wheel, the casing is provided with arcuate slots having sides formed by parallel planes, thus forming a discharge aperture enabling the molded unit of material to be dispensed into a rotatable wrapping wheel. A stationary bar 132, Fig. 9, extends across the end of the casing and provides a mounting for two actuating buttons 133 and 134 each of which has in extensible projection for movement into and from the space 135 adjacent to the outer end of casing 22.

Extending through an aperture 136 in said bar is a rocking shaft 137, Fig. 10, at the inner end of which is a contact bar 138, said shaft being actuated by the crank arm 126, Fig. 6.

Housed within casing 22 is a rotatable molding head containing two pairs of longitudinally spaced molding blocks. The molding head is provided with an axially disposed splined extension 139 at one end. This extension fits into keyways within a hub member not shown, the exterior of which is formed with sprocket teeth 113 over which the drive chain 112 passes. This hub member is positioned upon friction reducing bearings in a suitable drive sprocket housing extending upwardly between the frameworks 116 and 117 (Fig. 7). It will be understood that in our preferred high-capacity apparatus a similar molding head having two or more pairs of molding blocks is mounted with its splined extension fitting into the same hub member, so that drive chain 112 serves to actuate four pairs of molding blocks simultaneously.

The molding head preferably comprises a sleeve-like portion 140 open at the end toward the bar 132 and closed by a solid end wall 141 at its inner extremity. Along one diameter the head may include one set of inwardly extending webs 142 and 143 and a set of diametrically disposed inwardly extending webs 144 and 145. Along a second diameter normal to the first mentioned diameter the head may include one set of inwardly extending massive bosses 146 and 147, and a set of similar bosses 148 and 149 axially disposed from said first mentioned set. These bosses provide the encasing structure and cavities within which movable mold blocks are adapted to reciprocate in carrying out the molding and dispensing of plastic material.

Figure 11:
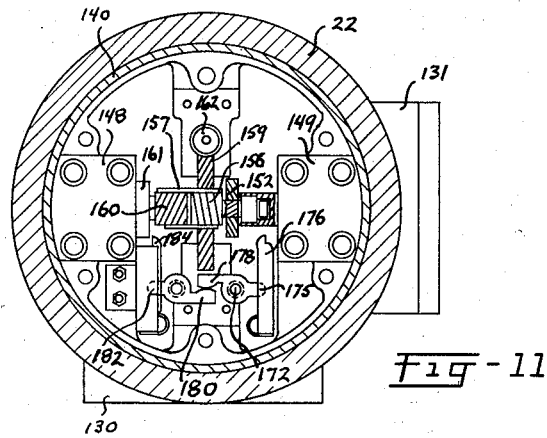
Fig. 11 is a transverse sectional view of portions of a molding unit taken generally along line 11—11 of Fig. 10.
Figure 12:
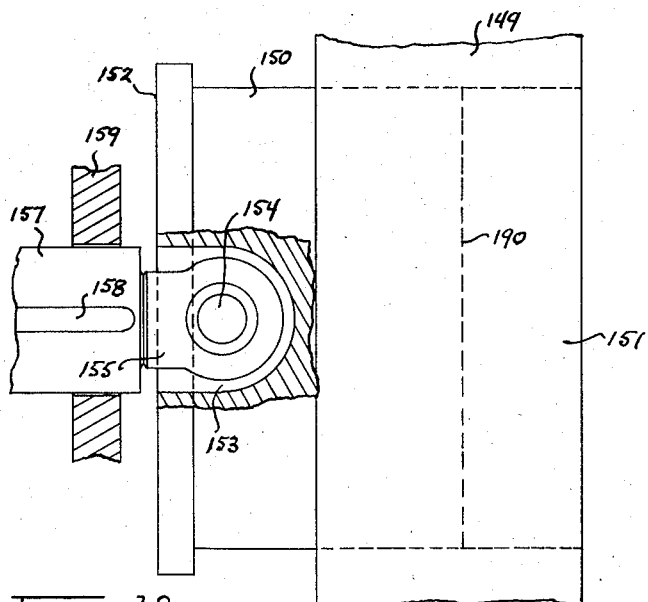
Fig. 12 is a view to a larger scale showing details of the mounting of a single mold block.

As best shown in Fig. 12, a mold block 150 suitable for forming and dispensing a one-fourth pound unit of margarine is shown in larger scale within boss 149, and with this block having an outer surface 190. Preferably, the unit has its long axis parallel to the axis of the molding head and the mold cavity 151 is generally of a square cross section, although this is not essential. At its inner end the block is provided with a latch engaging shoulder 152 and within a cut-away section 153 of the block, a pin 154 is mounted for attachment of an adjustable rod 155 terminating in a threaded cylinder 156 (Fig. 11) disposed within an interiorly threaded sleeve 157. Sleeve 157 contains an axial key 158 permitting the sleeve and its attached elements to move through a keyway contained in a gear 159 surrounding the sleeve. Also disposed within the sleeve is a second threaded cylinder 160 (Fig. 11) to which is attached a companion mold block having a latch engaging shoulder 161 and mounted in a companion boss 148. Mounting of the block upon a pin having an adjustable rod journalled thereon overcomes any difficulties of expansion, contraction, wear and alignment which might occur with a rigid construction.

The described arrangement provides an important feature of this invention, namely that the mold blocks are arranged in pairs and adapted for movement so that as one mold cavity, or compartment, is being filled its companion cavity, or compartment, is being discharged. Accordingly, the aggregate volume of each opposed pair of companion molding compartments is the same regardless of the position of the mold blocks. However, as is known, variations in the ingredients of the several materials being formed into the plastic material may necessitate periodically a change in this volume capacity to maintain a prescribed weight of unit.

In order to provide for adjustment of size of the several compartments without bringing the processing and related apparatus to a halt, the cylinders 156 and 160 and the sleeve 157 are so threaded that rotation of the sleeve in one direction moves both mold blocks an equal distance toward each other and rotation in the other direction moves both mold blocks an equal distance from each other.

Normally, the gear 159 surrounding the sleeve is at rest with respect to that sleeve. At its periphery, the gear is engaged with a worm 162 mounted upon an elongated shaft 163 which extends to the exterior of the molding head. Also carried by shaft 163 is a similar worm for the similar gear which provides for a similar actuation of the other pair of mold blocks contained in bosses 146 and 147 of the molding head.

At the outer end of the shaft 163 a star wheel 164 is rigidly mounted and projects within space 135 (Fig. 9) in intersecting relation to the axes of the projections on the spring biased adjusting buttons 133 and 134. Accordingly, when the molding head rotates in the direction shown in Fig. 8, the star wheel travels in an orbit about the center of the head. If it is desired, for example, to reduce the cavities in the mold block, button 133 may be pushed in to provide an obstruction in the orbit of the starwheel and during each rotation of the molding head that obstruction would cause the starwheel to turn a fraction of a revolution depending upon its shape. Turning of the starwheel causes a similar turning of shaft 163, worm 162 and gear 159. Turning of the gear which is keyed to the sleeve also causes the cylinders 156 and 160 to be pushed farther apart and thus to reduce the mold cavities. It will be observed that during this action the mold blocks are still connected as a unit and still reciprocate within the gear 159.

Conversely, to increase the size of the mold cavities, the projection of button 133 is withdrawn from intersecting position with the starwheel and the projection of button 134 is pushed into intersecting position.

We prefer to locate the respective buttons so that their projections fall on opposite sides of the orbit described by the axis of the starwheel as it is carried about by rotation of the molding head. The projection of button 134 therefore provides an obstruction to the starwheel so that it is turned in an opposite direction to its turning when intersecting the projection of button 133. When the sizes of the mold cavities are adjusted as desired, both the spring biased buttons are maintained in withdrawn position.

As a safety feature, the starwheel is formed with a notched hub held by a spring against a pin (not shown) in shaft 163 so that an overload causes the notch to slip from the pin and avoid further turning of the shaft. A driving disc 166 adjustably pinned to the shaft and backed by the compression spring 165 serves to provide for the initial adjustment of the mold blocks.

As a significant part of our invention, the actuation of the pairs of mold blocks, both for filling and for dispensing, is preferably caused by the pressure of the plastic material supplied from the above described pressure chamber. No supplementary pressure caused by additional pumps need be required and any excess working which might cause the structure of the plastic material to be adversely affected, is therefore avoided. Moreover, it is unnecessary to overfill the mold cavities and then to expel an excess fraction of material therefrom, as has been proposed by others. In general, the plastic material flows along a pressure gradient beginning at its maximum pressure when received from conduit 60 and ending at atmospheric pressure when discharged from the molding head into the wrapping means later to be described.

As will be apparent, each mold block is reciprocated only when positioned at one of two angular positions within the stationary molding casing 22. It will be understood, of course, that, for each pair of mold blocks, the casing 22 is provided with an inlet aperture connecting with the conduit leading from manifold 68, in order to receive the plastic material under pressure, and with an outlet aperture leading to the wrapping machine. For the latter, note the diagrammatic showing of such outlet apertures in Fig. 22. In order to insure that the mold blocks will be actuated when positioned in alignment with such apertures and at no other time, an improved latching and unloatching mechanism is provided.

As seen in Figs. 8 and 10, a rocking shaft 170 extends longitudinally of the molding head and is supported internally of the rotable sleeve 140. This shaft carries at one end an arm 171 having an orbit extending into intersecting relation with the outer ends of the contact bar 138.

That bar is rigidly attached to the shaft 137 fixed to the crank arm 126 and which, in turn, is actuated from within gear box 17. A parallel rocking shaft 172 has an arm 173 for engaging with a spring loaded latch 174 to move the same outwardly from engaging position with the shoulder of the mold block in boss 147 and has a similar arm 175 (Fig. 11) for engaging with a spring loaded latch 176 to move the same outwardly from engaging position with the shoulder 152 of the mold block 150 in boss 149.

The shaft 172 likewise has corresponding arms 177 and 178 engageable with arms 179 and 180 on rocking shaft 170 and actuatable thereby. Shaft 170, moreover, has arms 181 and 182 engaging respectively with spring loaded latches 183 and 184 to move the same outwardly from engaging position with the shoulders of the mold blocks in the bosses 146 and 148, respectively.

In operation, therefore, with the molding head intermittently at rest as shown in Fig. 8, movement of arm 126 causes a rotation of contact bar 138 which turns arm 171 to the left. Movement of this arm rocks shaft 170 causing its arms 179 and 180 to engage arms 177 and 178 respectively on the second rocking shaft 172 and to cause its arms 173 and 175 to pull the latches 174 and 176 respectively out of engagement with the shoulders 152 on the mold blocks in bosses 147 and 149.

At this time pressure of the plastic material forces the two pairs of mold blocks to the left, filling completely the righthandmost molds (Figs. 8 and 11) and extruding the previously molded units from the lefthandmost molds.

In connection with this filling and extrusion action of the mold blocks, the end of contact bar 138 meanwhile moves over the end of the arm 171 as the arm 126 is being rocked to its limit of movement. Also following the filling and extrusion action the molding head is rotated through 180° and during this rotation the contact bar 138 is restored to its original position whereupon, when the head reaches its 180° displacement, the arm 126 may again turn clockwise to initiate the next unlatching action. At this next unlatching the shafts 170 and 172 are disposed 180° from their position of Figs. 8 and 11 and movement of arm 126 again engages the arm 171 with contact bar 138, the other end of that bar, however, now being effective. As will be understood, at this phase of the operation, the molds which previously were being filled are now being discharged, and the molds which previously were being discharged are now being filled.

*The wrapping means*

Figure 14:
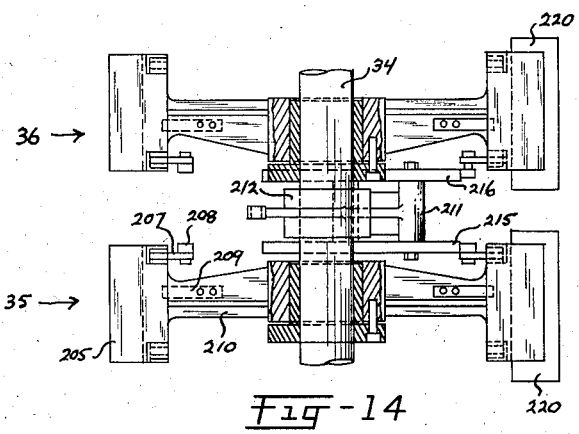
Fig. 14 is a view showing parts in plan and in section of the wheels shown in Fig. 13.
Figure 13:
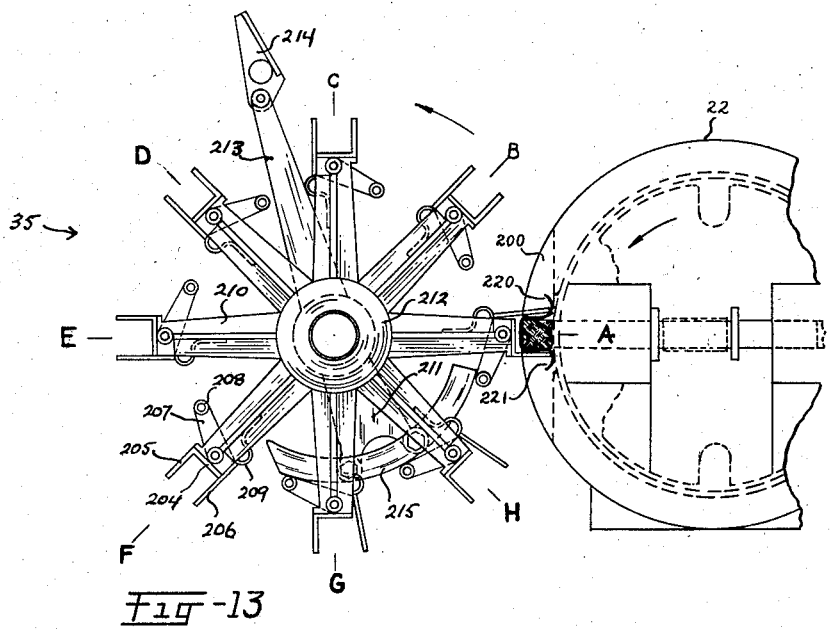
Fig. 13 is a side elevation view of an improved wrapping wheel for handling the units of molded material dispensed from the molding apparatus and shown diagrammatically in part, the wrapping wheel being shown detached from its driving apparatus for purposes of clarity.

Referring now to Figs. 1, 13 and 14, a wrapping wheel corresponding to each of the pairs of mold blocks within the molding apparatus, is mounted upon a shaft 34, each wheel having a plurality of radially spaced open ended receptacles for receiving and temporarily holding the dispensed unit of plastic material. As best shown in Fig. 13, the wheel 35 is mounted so as to turn counterclockwise, the molding head within casing 22 meanwhile being also turned counterclockwise. The extremity of each of the receptacles is formed to move within arcuate slot 200 in the casing, similar slots 201, 202 and 203 (Fig. 22) being provided for reception of the receptacles on the remaining wheels 36, 37 and 38. We prefer to employ wrapping wheels having eight stations of rest, as will be apparent when the driving means therefor is later described. These eight stations are indicated diagrammatically in Figs. 13, 17 and 20, as A, B, C, D, E, F, G and H, respectively.

As best shown in Figs. 13 and 14, each wheel contains a plurality of receptacles having a rigid bottom wall, 204, a rigid side wall 205, and a pivoted side wall 206. The pivoted wall carries an arm 207 having a roller 208 at the end thereof and is biased into closing position by a suitable spring 209. The receptacles are open at each end and are mounted on the extreme end of spokes 210 of the wheel. Also, supported upon the shaft 34, preferably between the adjacent wheels of a pair, is a cam support 211 having a bushing 212 surrounding the rotatable shaft for supporting the stationary cam support. An arm 213 having a mounting means 214 thereon is formed at one end of the cam support. At the opposite end the support holds a pair of spaced cam blocks 215 and 216 in position to be engaged by each of the rollers 208 as the wheels rotate with shaft 34. Engagement of a roller with the cam block causes the pivoted wall to move outwardly releasing the holding grip of the receptacle upon the unit of plastic material therein. As will be seen, the cam blocks preferably intercept the rollers during the initial dispensing of the material from the molding head as well as during the period when gravity permits the wrapped unit of material to fall freely from the wrapping wheel. Upon falling from the wheel, such wrapped unit is, of course, transported to the left of Fig. 13, by the conveyor to a cartoning machine, or other point of disposal.

It will be seen in Fig. 13 that an enwrapment 220 is interposed between the wrapping wheel and the casing 22 before the molded unit of material is dispensed from the molding apparatus. The method and apparatus for supplying this enwrapment and the operation of the wrapping wheel with respect thereto will later be described, but at this time it is to be noted that such enwrapment encases three sides of the molded unit as the wrapping wheel leaves its engagement with the arcuate slot in the casing 22 and that the ends of the enwrapment project beyond the ends of the walls of the receptacle in that wheel, Fig. 14.

It will further be understood that as the molding heads within casing 22 rotate, after having completed the dispensing of the molded units of material, they pass by the narrow lips of the casing bounding the several discharge apertures 200, 201, 202 and 203. Any small residue of plastic material tending to adhere to the surfaces 190 of the molding blocks (which surface may have either a plane or a convex shape) therefore is squeezed outwardly upon the trailing edge of the enwrapment and is carried by that enwrapment as it passes to the packaging station C.

We prefer to have both the wrapping wheels and the molding heads in casing 22 turn in the same rotary direction. This assures a rapid separation of the same at their points of tangency and eliminates the need for special accelerating mechanisms, such as found in some previous molding and wrapping structures.

Referring now to Figs. 1, 2, 15 and 16, the drive arrangement for actuating the above described wrapping wheels and associated mechanism, is shown. The vertical, extensible shaft 32 carries a pinion gear 230 engageable with worm gear 231, mounted upon transverse drive shaft 232. This shaft in turn carries a gear 233 engageable with a gear 234 on idler shaft 235. Spaced from gear 234 on the idler shaft is a plate 236 having a Geneva gear roller pin 237 rigidly mounted between said gear and plate.

On shaft 34 intermediate the wrapping wheels 36 and 37, is located a driving Geneva gear 240 (Fig. 16) adapted to move all of the wrapping wheels as a unit stepwise through a revolution, eight such steps being shown and with each wrapping wheel having eight receptacles as before described. It will be appreciated that the driving mechanism for the Geneva gear is coordinated with the driving mechanism for the Ferguson Roller Gear drive in gear box 17 to the end that each time the molding head turns through one-half a revolution, the wrapping wheels turn through one-eighth of a revolution. Furthermore, each of the molding heads and the wrapping wheels are at rest for a simultaneous period of time although this period of time does not necessarily have to be simultaneously coterminous at both beginning and ending.

Figure 16:
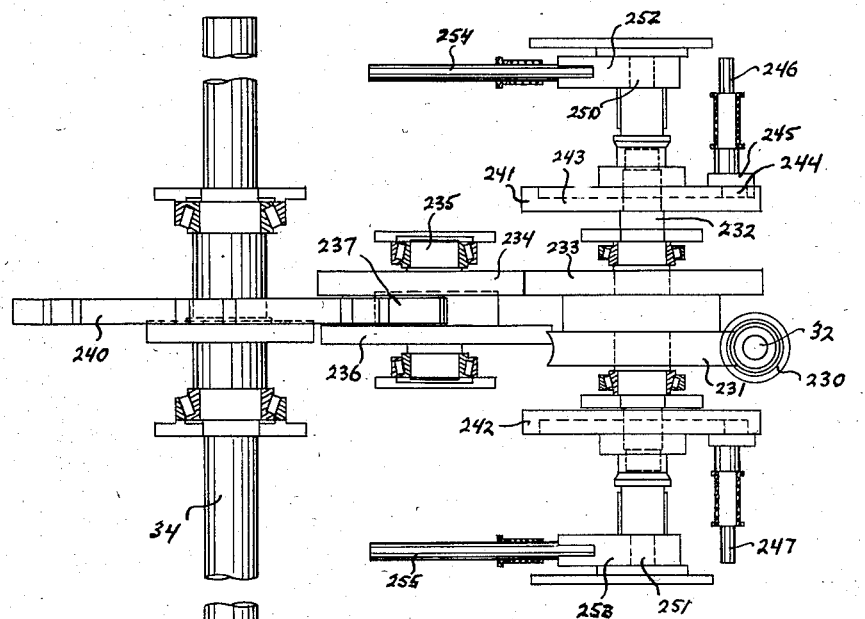
Fig. 16 is a plan view of the mechanism shown in Fig. 15 and with the housing omitted.
Figure 15:
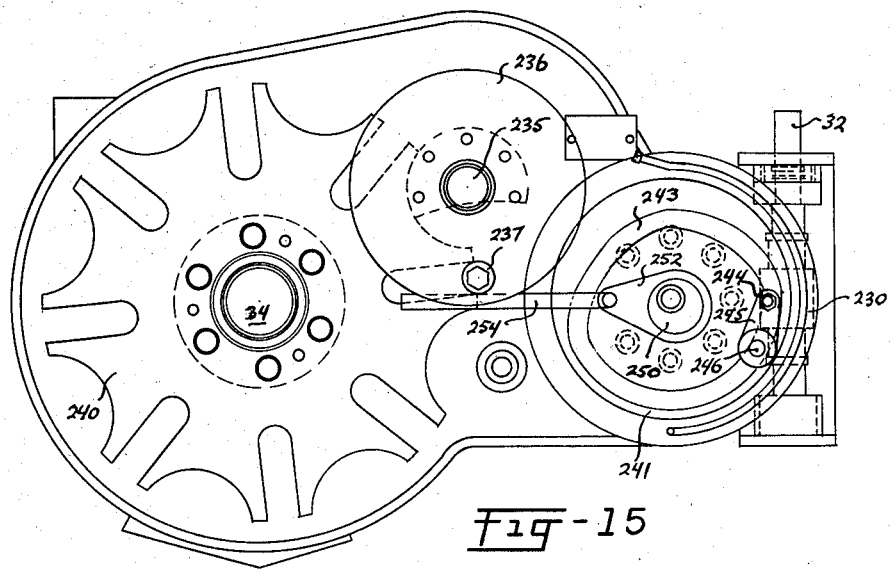
Fig. 15 is a side elevation and inverted view of the mechanism for driving the wrapping wheels and associated mechanism.

As shown in Figs. 15 and 16, the drive for actuating the wrapping mechanism for the several wrapping wheels is taken from shaft 232. Outboard of its central bearings this shaft is provided with spaced cam blocks 241 and 242 of similar configuration and setting. Block 241 (Fig. 15) has a cam groove 243 within which a roller 244 is adapted to ride, this roller being mounted on one end of a crank arm 245, the other end of which is attached to rocking shaft 246. A similar rocking shaft 247 is mounted and driven in similar manner from the companion cam block 242.

Also mounted upon shaft 232 adjacent its outer ends are two eccentrics 250 and 251 having straps 252 and 253 to which are attached reciprocable rods 254 and 255, connected to package reshaping means, later to be described.

Figure 18:
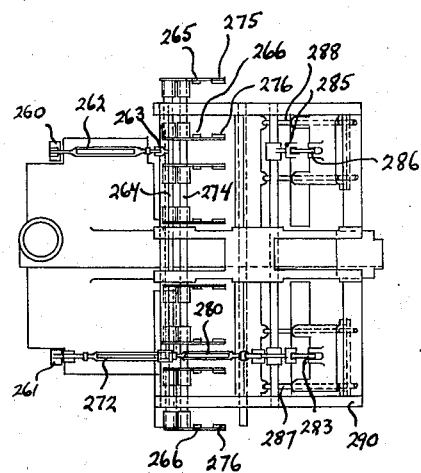
Fig. 18 is a plan view of the mechanism shown in Fig. 17.
Figure 17:
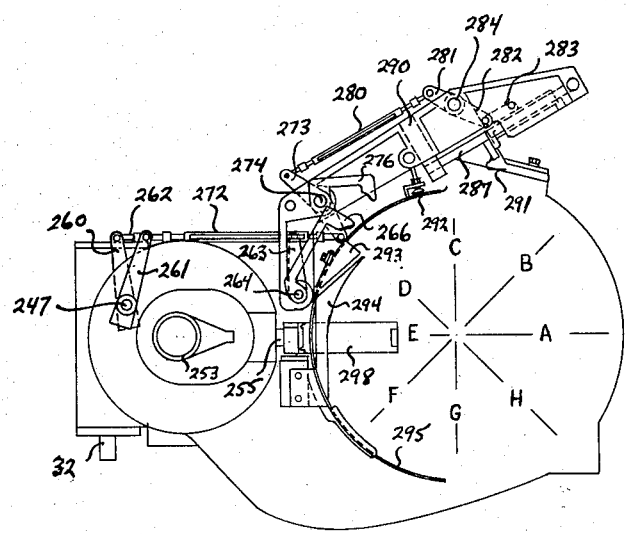
Fig. 17 is an elevation view of the wrapping mechanism and drive therefor employed with the wrapping wheel, which wheel is omitted in the interest of clarity.

Referring now to Figs. 16, 17 and 18, a crank arm 260 is shown as attached to rocking shaft 246 and a similar crank arm 261 is attached to rocking shaft 247. Extending from arm 260 is an adjustable rod 262 leading to crank arm 263 attached at one end to rocking shaft 264. This shaft extends transversely of the wrapping mechanism and carries four pairs of end tucking fingers, as indicated at 265 and 266, which fingers provide for the first end folding step for the enwrapment of the molded units, as will later appear.

Extending from crank arm 261 is an adjustable rod 272 connected to the lower end of a bell crank 273 which is rigidly affixed to a second rocking shaft 274 extending transversely of the wrapping mechanism. Rigidly mounted upon this rocking shaft are four pairs of end tucking fingers as indicated at 275 and 276, which fingers provide for the second end folding step for the enwrapment of the molded units.

At its upper end the bell crank 273 has attached thereto an adjustable rod 280 connected at its other end to one end of a bell crank 281, whose other end 282 is connected to a link 283. This bell crank is rigidly affixed to a shaft 284 extending transversely of the wrapping mechanism and having a rigid arm 285, connected to a second link 286. Each of the links is attached to sliding frameworks guided along rods 287 and 288 and movable toward the station C of the wrapping wheel at a downwardly extending angle. A rigid framework indicated generally at 290 supports the above described wrapping mechanism. Suspended from each of the frameworks slidable along guide rods 280 and 288 is a springlike contact member 291 having the dual function of pressing the molded unit of plastic material dispensed from the molding head, deeper into the receptacle on the wheel, and of folding the trailing edge 221 of the enwrapment forwardly upon the molded unit.

Attached to framework 290 are a series of stationary members 292, 293, 294 and 295 against which the unit of material is brought into contact during the movement of the supporting wrapping wheel. While the function of these members will be more fully described in connection with Fig. 20, it will be seen that springlike member 292 lies in the trajectory of the unit as it is moved from station C to station D and folds the leading edge of the enwrapment back upon the molded unit. Furthermore, member 293, comprising two rigid triangular shaped spaced walls at the ends of the open receptacles of the wrapping wheel, engages the projecting ends of the enwrapment as it is moved from station D toward station E and completes the third end fold of the enwrapment. Also, member 294 comprises two spaced, inclined walls at the ends of the wrapping receptacles and includes camlike upper surfaces in the trajectory of the unit and along which the final projecting section of the enwrapment is pushed as the unit is carried from station D toward station E. During this movement the fourth and final end fold of the enwrapment is accomplished.

Member 295 forms a floor along which the wrapped unit slides in inverted position as it is moved from reshaping station E to the dropout station G.

Considering now Fig. 20, the positions occupied by the several above described members during the described wrapping operation, is shown in greater detail. It will be seen that the inclined mounting of rod 287 enables the contact member 291 to travel simultaneously with the moving unit of material being transported from station B to station C. During this movement member 291 not only lays the trailing edge of the enwrapment over the uncovered upper side of the molded unit but also presses that unit downwardly into snug contact with the three sides of the receptacle. Preferably, the unit, as dispensed by the mold block, is not deposited into the bottom of the receptacle but has a portion projecting out of the receptacle until it reaches station C. By this ararngement a more efficient enclosing of all of the material dispensed by the mold block may be achieved by the enwrapment.

At the time that member 291 is in contact with the unit at station C, the bell crank 281 is in the position shown in Fig. 20 and during its movement to this position bell crank 273 also has been moved to the position shown.

Before completion of and during that movement, however, the fingers 266 on each side of the unit then in the receptacle at station D had been moved downwardly thereby effecting the first end fold or tuck of the enwrapment. As those fingers begin to rise from their lowermost point of travel, fingers 276 move into slightly overlapping position with respect thereto, thus confining a portion of the end of the enwrapment between the two fingers 266 and 276 and providing a sharply defined crease in that portion of the enwrapment. As fingers 266 continue to withdraw, fingers 276 therefore press the creased end of the enwrapment against the end of the unit of material and effect a neat second end fold or tuck of the enwrapment. This relative timed motion is achieved by having rocking shaft 264 driven by the separately actuated arm 260. Following completion of the second end fold, rod 262 is actuated to return the wrapping mechanism to the position of Fig. 17 and the Geneva gear is actuated to move the wrapping wheel through another one-eighth of a revolution.

As the wheel moves, the forward edge of the enwrapment on the unit at station C is then laid upon the top of the unit by the stationary member 292. Simultaneously, the lefthandmost outstanding edge of the partially enwrapped unit at station D is engaged by the spaced stationary members 293 and the bottom outstanding edge of the partially enwrapped unit at station D is simultaneously guided along the top cam surface of the spaced members 294. Therefore, with the movement of the unit from station D to station E, the third end fold or tuck is accomplished by members 293 which thereupon hold the third folded portion of the enwrapment in place while the fourth and final folded portion is being creased and laid in position upon said third folded portion, due to the engagement of that fourth portion with the top cam surface of the stationary members 294.

Figure 19:
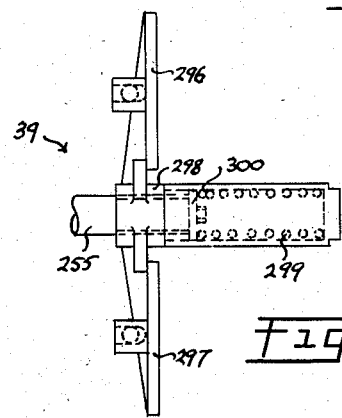
Fig. 19 is a plan view of the reshaping means for the wrapped molded unit.

Upon reaching station E a completely wrapped package snugly held in contact jointly with the bottom wall 204, the side walls 205 and 206 and end members 294, is thus presented to the reshaping means. For purposes of efficient cartoning and in order to avoid any adverse sales appeal of a slightly deformed shape of package, we prefer to reshape the package before it leaves the wrapping process although our invention in its broader aspects does not necessarily require this step. Therefore, with the wrapping wheel at station E and with the unit of plastic material in the receptacle now completely encased in its enwrapment and forming the package of commerce, a reshaping of the package now occurs. It will be understood that during the dispensing from the molding head; during the enclosing of all of the material dispensed by that molding head; and during the several previous steps of folding of the enwrapment; some deformation of the square, rectangular shape of the plastic material may have occurred. As best shown in Fig. 19, there is provided a reshaping means 39 comprising two spaced bars 296 and 297 mounted upon a framework 298 attached to the end of rod 255 and adapted for reciprocation in the path of the open ends of the receptacles on the wrapping wheels when dwelling at station E. A similar reshaping means is attached to rod 254 at the other side of the apparatus. Framework 298 includes an internal cylinder having therein a compression spring 299 against which an abutment 300 bears at all times. As rod 255 is moved to the right (Fig. 17) by eccentric sheave 253, the bars 296 and 297 press against the respective wrapped packages in the receptacles of the wrapping wheels and force the packages snugly against the walls 204, 205 and 206 of those receptacles, the confined package being further confined at its ends by the spaced members 294. This pressing action is controlled, however, by the resistance of spring 299 so that no extrusion of the material out of the wrapped package occurs.

Following the reshaping, the package is held in the receptacle by contact with floor member 295 as the wheel moves to discharge station G. As it reaches this station the roller 208 engages the cam block 215 and movable wall 206 of the receptacle is opened outwardly thus permitting the package to drop out of the wheel and to be carried away by the moving conveyor. If desired, means may be provided to cause the package to rotate as it falls upon the conveyor.

*The enwrapment supply*

With the foregoing description of the molding and wrapping apparatus and drives therefor in mind, reference now is made to the improved enwrapment system. In order to maintain uninterrupted operation for long periods of time, preferably for four-hour periods, comparatively large and heavy rolls of enwrapment material are used and our invention has as a feature the mounting of such rolls in a convenient location requiring a minimum of lifting by the operator. As best shown in Fig. 1, four rolls, one of each corresponding to each of the sets of molding blocks and wrapping wheels, are mounted at one extreme end of the frame 10, roll 50 being shown as an example. The shafts of these rolls are set upon a suitable transverse, substantially frictionless bearing 301 positioned at an elevation permitting easy handling of the roll. It will be understood that several such bearings, not necessarily on the same axis, may be used rather than having all rolls rotatable on the same bearing.

A suitable braking means 302 anchored at one end upon frame 10 and attached at the other end to a linkage 303 may exert a regulated braking effect upon the rotation of the heavy roll to prevent an undesired unrolling action and at the same time to establish a constant tension in the web W being advanced by the advancing apparatus 55. By means of a dancing roll 53 contacting lever 51 and operating the linkage 303, the web is maintained at the desired tension as it passes over idlers 52 and 54 and is pulled into apparatus 55. As seen in Fig. 21 the web is pulled forward by engagement with the rolls 56 and is directed through a guiding frame 305, passes between severing rolls 57 and through guiding frame 306 and then is engaged by the larger diameter advancing rolls 58. The rolls 58 then move the web, in the form of successive severed enwrapments 220, through an arcuate guiding frame 307 in close proximity to the surface of molding casing 22 and into position where they may be grasped in turn by the enwrapment positioning mechanism, best shown in Figs. 6 and 22.

As will be recalled, the slow speed shaft 18 in gear box 17 has an externally projecting end 19. Mounted upon that shaft end is a cam 310 having both an interior cam slot 311 and a peripheral cam surface provided with two tripping cam blocks 312 and 313. Mounted upon the stationary gear box are a lever support 314 and a rod guide support 315. Pivotally mounted at one end in support 314 is an actuating lever 316 having a roller pin 317 engageable in cam slot 311 and attached at its other end to the enwrapment positioning mechanism. This mechanism is adapted to reciprocate in a vertical plane and includes a support bar 320 having a guide rod 321 suspended therefrom and slidable in the guide support 315.

Carried by the support bar are two main guide rods 322 and 323 mounted in bearing supports 324 and 325 on the gear box and carrying finger supporting frameworks 326 and 327 at their upper ends. Mounted upon each of these frameworks are two pairs of finger assemblies, one pair of fingers mounted in such an assembly being shown in full in Fig. 22 in relation to the discharge aperture slot 203 of the molding apparatus. At the lower position of the frameworks, appropriate webs are provided to act as bushings for an elongated rocking shaft 330 having cams thereon for actuating the finger assemblies. Cams 331 and 332 for operating fingers 333 and 334 are typical.

Each finger assembly may comprise a movable clamping jaw 335 actuated by an internally mounted rod having a spring biasing the jaw into closed position against a clamping block 336. Movement of the cam on rocking shaft 330 opens the jaw against the action of the spring and enables the finger to clasp the lower end of an enwrapment 220 fed at that moment downwardly through the guiding frame 307. It will be understood that this action occurs when the finger assembly is at its uppermost path of travel and that each of a pair of such finger assemblies grasp a given enwrapment adjacent the lower, and at opposite, ends. For the purpose of stretching the enwrapment transversely in order to eliminate any sag, the surface of the molding casing 22 may have fixed abutments (not shown) forcing the extreme ends of the blocks 336 on a pair of fingers slightly toward each other at the moment of grasping of the enwrapment. Then, as the fingers move downwardly, they may spring back to their normal separation thus placing the grasped enwrapment in tension. Normally, in a new apparatus, a springing apart of about 1/32 inch is sufficient.

The actuation of the rocking shaft 330 may be suitably accomplished by means of a bell crank 340 having a cam follower 341 actuated by the cam blocks 312 and 313.

At one end the crank is attached to rod 342 provided with a crank arm 343 attached to vertical shaft 344. This shaft oscillates within supports 345 and 346 and has oppositely directed tripping cams 347 and 348 mounted near its ends at positions corresponding to the maximum travel upwardly and downwardly of the shaft 330. At a location suitable for engagement with these tripping cams, shaft 330 has a laterally projecting pin 349. Movement of cam follower 341, which occurs either with the enwrapment positioning mechanism at its uppermost or lowermost position, causes shaft 344 to rock in one direction and its cams 347 and 348 to rock therewith. Either cam, upon engaging pin 349, causes shaft 330 to rock, thus turning cams 331 and 332 and causing the clamping jaws of the appropriate finger to open. When this action occurs with the mechanism in its uppermost position, the jaw receives a new enwrapment; when it occurs with the mechanism in its lowermost position, it releases the enwrapment.

While the function and operation of the several coordinated portions of the apparatus of our invention has been set forth in the foregoing, a recapitulation of the method involved, may now be described.

A continuous stream of plastic material under pressure is delivered into conduit 60 from a high capacity processing apparatus operating at its maximum capabilities. Without subjecting the processing apparatus to limitations imposed by the molding, wrapping or conveyor takeoff apparatus, the stream of material flows into the pressure vessel system and thence into the high-speed intermittently rotatable molding heads. Utilizing the pressure of the material itself, the molding operation is conducted within an enclosed system and a plurality of molded units are dispensed at intervals into an intermittently rotatable system of wrapping wheels. Enwrapment material is supplied between the molding and wrapping apparatus and these two types of apparatus are mounted for separation, one from the other, even during continued operation of the supply of material and of the driving means of the entire structure. A plurality of molding means and wrapping means having an aggregate capacity equal the capacity of the material processing apparatus is provided and is compactly arranged in a dynamically balanced structure. Accordingly, it will be seen that the objectives of our invention are accomplished with a unitary drive structure contributing to the use of less floor space and the avoidance of duplicated machinery.

As many changes could be made in the above method and apparatus and many apparently widely different embodiments of this invention could be made without departing from the scope of the claims it is intended that all matter contained in the above description or shown in the accompanying drawing shall be interpreted as illustrative, and not in a limiting sense.

What we claim as new and desire to secure by Letters Patent of the United States is:

1. The method of producing packages of plastic material which comprises supplying material continuously at a constant rate under pressure to a pressure vessel, directing material from said vessel in a plurality of separate flow paths to a plurality of separate expansible molding compartments, intermittently flowing said material into each of said compartments and utilizing the pressure of the incoming material to extrude previously molded material from companion molding compartments during the flow into said first-mentioned compartments, dispensing said previously molded material in the form of separate units into separate enwrapments while continuing to utilize the pressure of the incoming material to deposit said separate units in partially enwrapped form into separate wrapping receptacles, interposing an enwrapment at the dispensing side of each of said companion compartments in timed sequence with the interrupted flow of said material into said first mentioned compartments, and completing the enwrapment of said deposited units.

2. The method of claim 1, including regulating the production of said packages of material by controlling the molding and wrapping of said material in dependence upon the volume of material contained in said pressure vessel.

3. The method of claim 1 including, maintaining the aggregate volume of each molding compartment and of its companion molding compartment uniform by increasing the volume of one compartment as the other decreases.

4. The method of claim 3 including, changing the selected aggregate volume without interrupting production of said packages of material and thereafter continuing the production of packages having the newly selected volume of material therein.

5. Apparatus for producing packages of plastic material which comprises, an expansible pressure vessel for receiving material in a continuous stream at a constant rate under pressure, means for controlling admission of said material to said vessel, a separate power source for actuating said controlling means, a pressure system for applying a back pressure to the material introduced into said vessel, a separate power source for generating said back pressure, a molding apparatus for receiving said material under pressure from said pressure vessel and comprising a pair of connected mold blocks arranged for dispensing of a molded unit of material by one block while the other block is molding a subsequent unit during its reception of material from said pressure vessel, means for driving said molding apparatus, a wrapping apparatus for receiving molded units of material from said molding apparatus, said molding apparatus serving to discharge said molded units into said wrapping apparatus by the pressure exerted thereon by said material in said pressure vessel, means for driving said wrapping apparatus, means for supplying an enwrapment for said molded units passing from said molding apparatus to said wrapping apparatus, means for driving said enwrapment supply means and a single power course for actuating said molding apparatus drive means, said wrapping apparatus drive means, and said enwrapment supplying drive means in timed sequence with each other.

6. The method of producing packages of plastic material which comprises, moving an expansible molding compartment into communication with a source of plastic material under pressure, flowing said material into said compartment while maintaining a constant sized supply opening into said compartment, directly utilizing the pressure of said material to extrude previously molded material from a companion molding compartment during the flow of material into said first-mentioned compartment, dispensing said previously molded material into an enwrapment, and producing relative movement between said companion molding compartment and said enwrapment following the flowing of material into said first mentioned compartment.

7. The method as defined in claim 6 wherein the relative movement between said compartment and enwrapment is in opposite directions.

8. The method as defined in claim 6 wherein substantially all of the material flowing into a compartment is later discharged in the form of a molded unit of material.

9. The method as defined in claim 6 wherein the relative movement of the compartment and enwrapment is utilized to deposit any residual material from said compartment upon said enwrapment and to incorporate in the molded unit of material substantially all of the material previously flowed into said compartment.

10. Apparatus for molding a supply of plastic material under pressure including, a stationary molding casing having a filling aperture communicating with said supply of material, and a discharge aperture, a rotatable molding head mounted within said casing and having at least one pair of movable mold blocks therein, means connecting said blocks to operate as a unit whereby one mold compartment is filled at said filling aperture as the other mold compartment is discharged at said discharge aperture, means for rotating said molding head intermittently, latching means for holding said movable blocks stationary in communication with said apertures, and means for releasing said latching means thereby to permit the plastic material under pressure to effect the filling of one of said mold compartments and the discharge of the other of said compartments.

11. Apparatus as defined in claim 10 wherein, said apparatus includes selectively operable means for adjusting the size of each of said compartments during the rotation of said molding head.

12. In the method of packaging plastic materials, the steps which comprise, intermittently and rotatably advancing a series of molding compartments containing plastic material, feeding a sequence of enwrapments in synchronization with the movement of said compartments and substantially tangent to the path of said compartments, dispensing plastic material from said compartments into said enwrapments and rotatably removing said enwrapments and dispensed material from contact with said compartments, said removal taking place in an opposite direction to the movement of said compartments whereby residual material from a surface of said compartment is squeezed upon said enwrapment following the dispensing of said material.

13. In combination with a supply of moldable plastic material under pressure, a rotatable wrapping wheel having receptacles for receiving molded units of material, a rotatable molding head having molding means for dispensing molded units of said material into said receptacles, means for driving said wheel and said molding head intermittently in the same rotary direction, and means for flowing said material into said molding means while said wheel and said molding head are at rest, said means for dispensing molded units and said means for flowing material into said molding means being located substantially diametrically of said molding head.

14. In combination with a supply of moldable plastic material under pressure, a rotatable wrapping wheel having receptacles for receiving molded units of material, a rotatable molding head having a pair of connected mold blocks actuated by the flow of said material under pressure and arranged for dispensing of a molded unit of material, into said wrapping wheel by one block while the other block is molding a subsequent unit of material, means for driving said wheel and said molding head intermittently in the same rotary direction and means for flowing said material into said molding head while said wheel and said molding head are at rest, said molding blocks being located substantially diametrically of said molding head.

15. In combination with a supply of plastic material under pressure, a rotatable wrapping wheel having receptacles for normally receiving molded units of material, a rotatable molding head having molding means for normally dispensing molded units of material into said receptacles, means for flowing said material into said molding head, means for driving said wheel and said molding head, and means for separating said wheel from said head to divert said molded units from said wheel while continuing the operation of said driving means.

16. In combination with a supply of plastic material under pressure, a rotatable wrapping wheel having receptacles for normally receiving molded partially enwrapped units of material, a rotatable molding head having molding means for normally dispensing molded units of material into said receptacles, an enwrapment supply means for interposing enwrapments between said receptacles and molding head, means for driving said wheel, enwrapment supply means and molding head, means for flowing material into said molding head and means for separating said wheel from said enwrapment supply means and molding head to divert said partially enwrapped, molded units from said wheel while continuing the operation of said driving means.

17. Apparatus for wrapping square rod-shaped units of plastic material including, a wrapping wheel having a plurality of open-ended, three-sided receptacles, means for depositing a unit of material encased on three sides with an enwrapment into said receptacles, a first and movable means for folding a trailing portion of said enwrapment to partially cover the fourth side of said unit, a second and stationary means for folding a leading portion of said enwrapment to complete the covering of said fourth side of the unit, and a third and movable means for folding a portion of the enwrapment upon the ends of said unit, a fourth and movable means for folding a portion of the enwrapment upon the ends of the unit, a fifth and stationary means for folding a portion of the enwrapment upon the ends of said unit, a sixth and stationary means for folding the final portion of the enwrapment upon the ends of the unit, a stationary framework mounted above said wheel, a first rocking shaft for actuating said third means, a second rocking shaft for actuating said fourth means, a sliding framework for actuating said first means, said rocking shafts and sliding framework being supported upon said stationary framework, means for intermittently rotating said wheel and for actuating said rocking shafts and sliding framework in timed sequence therewith, and means for removing the wrapped unit from said wheel.

18. Apparatus for wrapping square rod-shaped units of plastic material including, a wrapping wheel having a plurality of open-ended, three-sided receptacles, means for depositing a unit of material encased on three sides with an enwrapment into said receptacles, a first and movable means for folding a trailing portion of said enwrapment to partially cover the fourth side of said unit, a second and stationary means for folding a leading portion of said enwrapment to complete the covering of said fourth side of the unit, a third and movable means for folding a portion of the enwrapment upon the ends of the unit, a fourth and movable means for folding a portion of the enwrapment upon the ends of the unit, a fifth and stationary means for folding a portion of the enwrapment upon the ends of the unit, a sixth and stationary means for folding the final portion of the enwrapment upon the ends of the unit, a stationary framework mounted above said wheel, a first rocking shaft for actuating said third means, a second rocking shaft for actuating said fourth means, a sliding framework for actuating said first means, said rocking shafts and sliding framework being supported upon said stationary framework, means for intermittently rotating said wheel and for actuating said rocking shafts and sliding framework in timed sequence therewith, and cam means for moving one of the sides of said receptacle to separate the same from engagement with a wrapped unit thereby to permit that unit to fall from said wheel.

19. Apparatus for dispensing a plastic material in the form of separate, uniformly shaped units comprising, means supplying a continuously moving stream of material under pressure at a constant rate, a pressure vessel comprising a plurality of storage compartments for receiving said stream of material, means alternately connecting said supply means to said plurality of compartments with at least one of said compartments being connected to said supply means at any given time, manifold means receiving said material under pressure from said plurality of compartments, rotatable molding means receiving material under pressure from said manifold when positioned in a first position and dispensing a separate molded unit of material when positioned in a second position, and means for intermittently rotating said molding means, said first and second positions being disposed substantially diametrically opposite of said molding means.

20. In an apparatus for dispensing units of material from a continuously flowing stream of plastic material under pressure, the improvement comprising a pressure vessel having a plurality of separate storage compartments arranged along parallel axes, means alternately connecting said compartments to a supply source of said flowing stream with at least one of said compartments being connected to said source at any given time, a header receiving said material under pressure from said compartments, and a variable capacity storage compartment communicating at one end with said header and having a floating piston therein movable along an axis of said storage compartments.

21. Apparatus as described in claim 20 including, means for applying a constantly acting pressure to said piston in opposition to the pressure exerted thereon by said plastic material.

22. In an apparatus for molding a supply of plastic material under pressure, a stationary molding casing having a filling aperture communicating with said supply of material, and a discharge aperture substantially diametrically located in said casing with respect to said filling aperture, a rotatable molding head mounted within said casing and having at least one pair of mold blocks movable within substantially diametrically disposed mold compartments within said head, means coupling said blocks whereby one mold compartment is filled at said filling aperture as the other mold compartment is discharged at said discharge aperture, means for rotating said molding head intermittently, means for holding said blocks stationary in communication with said apertures until substantially fully registered therewith and means for releasing said holding means thereby to permit said material under pressure to effect the filling of one of said compartments and the simultaneous discharge of the other of said compartments.

References Cited in the file of this patent

UNITED STATES PATENTS

| | | |
|---|---|---|
| 1,384,921 | Rew | July 19, 1921 |
| 1,545,513 | Peters | July 14, 1925 |
| 1,880,378 | Epling | Oct. 4, 1932 |
| 2,474,136 | Wilson | June 21, 1949 |
| 2,653,430 | Vogt | Sept. 29, 1953 |